United States Patent
Berghegger

(10) Patent No.: US 7,295,449 B2
(45) Date of Patent: Nov. 13, 2007

(54) SIMPLE SWITCHED-MODE POWER SUPPLY WITH CURRENT AND VOLTAGE LIMITATION

(75) Inventor: Ralf Schröder genannt Berghegger, Glandorf (DE)

(73) Assignee: Friwo Mobile Power GmbH, Ostbevern (DE)

( * ) Notice: Subject to any disclaimer, the term of this patent is extended or adjusted under 35 U.S.C. 154(b) by 0 days.

(21) Appl. No.: 10/520,298

(22) PCT Filed: Feb. 26, 2004

(86) PCT No.: PCT/EP2004/001924

§ 371 (c)(1),
(2), (4) Date: Oct. 19, 2005

(87) PCT Pub. No.: WO2005/008872

PCT Pub. Date: Jan. 27, 2005

(65) Prior Publication Data

US 2006/0133117 A1    Jun. 22, 2006

(30) Foreign Application Priority Data

Jul. 15, 2003    (EP) .................................. 03016065

(51) Int. Cl.
*H02M 3/335* (2006.01)
(52) U.S. Cl. ............................. 363/19; 363/97; 363/131
(58) Field of Classification Search ................... 363/18, 363/19, 97, 131
See application file for complete search history.

(56) References Cited

U.S. PATENT DOCUMENTS 4,208,705 A * 6/1980 Hosoya ......................... 363/19

(Continued)

FOREIGN PATENT DOCUMENTS

EP    0 389 154    9/1990

(Continued)

OTHER PUBLICATIONS

PCT Notification of Transmittal of Copies of Translation of the International Preliminary Report on Patentability mailed Jun. 8, 2006.

*Primary Examiner*—Jeffrey Sterrett
(74) *Attorney, Agent, or Firm*—Michael Best & Friedrich LLP

(57) ABSTRACT

This invention relates to a primary-controlled switched-mode power supply of the type of a free-running flyback converter, which comprises a transformer with a primary-side winding, a secondary-side winding and at least one auxiliary winding. The switched-mode power supply comprises a primary-side switch, which is connected to the primary-side winding, in order to interrupt a current flow through the primary-side winding, a freely oscillating circuit for the generation of switching pulses, which drive the primary-side switch, and a circuit for generating an image voltage between the terminals of the auxiliary winding, in order to generate an image voltage, which on the primary side forms a voltage to be regulated on the secondary side. In order to provide a switched-mode power supply of this type, which with reduced complexity enables an improved control characteristic and an increased flexibility with regard to the operating parameters, the switched-mode power supply further comprises a time control unit, which is coupled to the primary-side switch such that the duration of a turn-off period of the primary-side switch can be adjusted within a switching cycle.

15 Claims, 6 Drawing Sheets

U.S. PATENT DOCUMENTS

| | | | |
|---|---|---|---|
| 4,630,186 A | 12/1986 | Kudo | |
| 4,758,937 A * | 7/1988 | Usui et al. | 363/19 |
| 5,175,675 A * | 12/1992 | Uramoto | 363/19 |
| 5,392,206 A * | 2/1995 | Peterson et al. | 363/19 |
| 5,867,373 A | 2/1999 | Lohrer et al. | |
| 6,185,112 B1 * | 2/2001 | Nishida et al. | 363/19 |
| 6,201,713 B1 * | 3/2001 | Hosotani | 363/19 |
| 6,285,566 B1 * | 9/2001 | Nakahira et al. | 363/19 |
| 6,295,211 B1 * | 9/2001 | Nishida et al. | 363/19 |
| 6,317,337 B1 * | 11/2001 | Yasumura | 363/21.04 |
| 6,452,817 B1 * | 9/2002 | Yasumura | 363/21.03 |
| 6,552,623 B2 * | 4/2003 | Nishida et al. | 331/111 |
| 6,577,511 B2 * | 6/2003 | Yamaguchi et al. | 363/21.07 |
| 6,631,079 B2 * | 10/2003 | Hosotani et al. | 363/19 |
| 6,898,090 B2 * | 5/2005 | Nishida et al. | 363/19 |
| 6,922,345 B2 * | 7/2005 | Nishida et al. | 363/21.16 |
| 2002/0186572 A1 | 12/2002 | Nishida et al. | |

FOREIGN PATENT DOCUMENTS

| | | |
|---|---|---|
| EP | 0 852 424 | 7/1998 |
| EP | 1 146 630 | 10/2001 |
| GB | 2 379 036 | 2/2003 |

* cited by examiner

SIMPLE SWITCHED-MODE POWER SUPPLY WITH CURRENT AND VOLTAGE LIMITATION

BACKGROUND OF THE INVENTION

1. Field of the Invention

This invention relates to a switched-mode power supply, in particular a switched-mode power supply with a primary side and a secondary side, which has a transformer with a primary-side winding, a secondary-side winding and at least one auxiliary winding. The primary-side winding and the auxiliary winding are connected to the primary side and the secondary-side winding is connected to the secondary side. The switched-mode power supply comprises a primary-side switch, which is connected to the primary-side winding, in order to interrupt a current flow through the primary-side winding, a freely oscillating circuit for the generation of switching pulses, which drive the primary-side switch, and a circuit for the generation of an image voltage between the terminals of the auxiliary winding, in order to generate an image voltage, which on the primary side forms a voltage to be regulated on the secondary side.

2. Description of the Related Art

Switched-mode power supplies are used in numerous electronic devices to generate the low direct voltage required for the supply of the electronic components from a mains voltage. In this respect switched-mode power supplies have prevailed over conventional power supplies with mains transformers in many applications, because above a certain power class they exhibit a better efficiency and in particular require less space.

The latter is in particular attributable to the fact that instead of the mains voltage a high frequency alternating voltage is transformed, which, instead of the usual mains frequency of 50 Hz or 60 Hz, may for example be in the range from 20 kHz to 200 kHz. Since the required number of windings on the transformer falls inversely proportionally to the frequency, the copper losses can in this way be significantly reduced and the actual transformer becomes substantially smaller.

To further optimise the efficiency, in particular primary switched-mode power supplies are known in which the frequency generated on the primary side of the high frequency transformer by the switch, for example a bipolar transistor, is regulated in dependence of the load applied to the secondary side of the power supply unit in order to regulate the transferred power. The feedback required for this type of regulation is for example realised in that a voltage tapped off an auxiliary winding is used as the controlled variable. An appropriate method of controlling the output current and/or the output voltage is described in EP 1 146 630 A2 and takes into account that the same energy is loaded into the transformer with each pulse. However, the circuit arrangement shown in this document has the disadvantage of being of comparatively complicated construction, because a relatively complex integrated circuit is used as the control circuit.

The most inexpensive way of building a switched-mode power supply with electrical insulation between the primary and secondary sections is with a free-running flyback converter. This type of power supply however, has principally the disadvantage that with low load the switching frequency increases noticeably. Consequently, the power loss with no load and with low loads is high.

An indirect measurement of the output voltage by measuring the voltage on a primary auxiliary winding or the main primary winding is more difficult with this type of power supply. Due to the induced voltage from the stray inductance, a brief voltage overshoot arises, which with a large pulse width can be filtered out in a simple manner, so that it is possible to determine the secondary voltage relatively accurately. With a low load the pulse width however reduces so far that it is hardly possible to filter out the voltage induced by the stray inductance. This means that the output voltage on low load can only be determined very inaccurately. An example of this type of simple discrete circuit technology can be found in the (unexamined) published British patent application GB 02379036. In this circuit the use of an optocoupler is suggested to counter the disadvantages of unsatisfactory control accuracy. Such an optocoupler, however, increases in turn the complexity and the r costs of the complete switched-mode power supply.

SUMMARY OF THE INVENTION

Therefore the object underlying the present invention is to provide a switched-mode power supply of the generic type which with reduced complexity facilitates an improved control characteristic and an increased flexibility with regard to the operating parameters.

The object is solved by a switched-mode power supply with the features of claim 1. Advantageous further developments of the switched-mode power supply according to the invention are the subject matter of various dependent claims.

The present invention is based on the idea that with the aid of a time control unit, which is coupled to the primary-side switch such that the duration of a switch-off period of the primary-side switch can be adjusted, and in particular extended, within one switching cycle, a low switching frequency can be retained for a low load and, consequently, an accurate voltage control and the setting of various output current characteristics are possible. Furthermore, the switched-mode power supply according to the present invention is constructed from a few inexpensive components. The switched-mode power supply according to the invention therefore offers the advantage of low costs with an exact output voltage control, low open-circuit input power and the capability of usage in extremely variable applications. Finally, the switched-mode power supply according to the invention also has the advantage of short-circuit protection.

According to an advantageous embodiment, the time control unit comprises a control capacitor for controlling the turn-off time of the primary-side switch by means of its charge current. In this way, speeding up of the turn-on process as well as speeding up of the turn-off process can be achieved. The turn-off period of the primary-side switch can be extended via the control capacitor in a particularly simple manner. In this way, the transferred power is set such that an almost load-independent output voltage is produced. The detection of the output voltage on the primary side is simplified such that the transferred energy is the same with each pulse so that a relatively long time is always provided, during which current flows in the secondary winding. Brief voltage spikes, which arise due to stray inductance, can with the switched-mode power supply according to the invention be filtered out by means of RC elements.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention is illustrated in the accompanying drawings, wherein.

DETAILED DESCRIPTION OF THE INVENTION

The illustrated embodiments of the present invention will be described with reference to the figure drawings wherein like elements and structures are indicated by like reference numbers.

Figure 1:
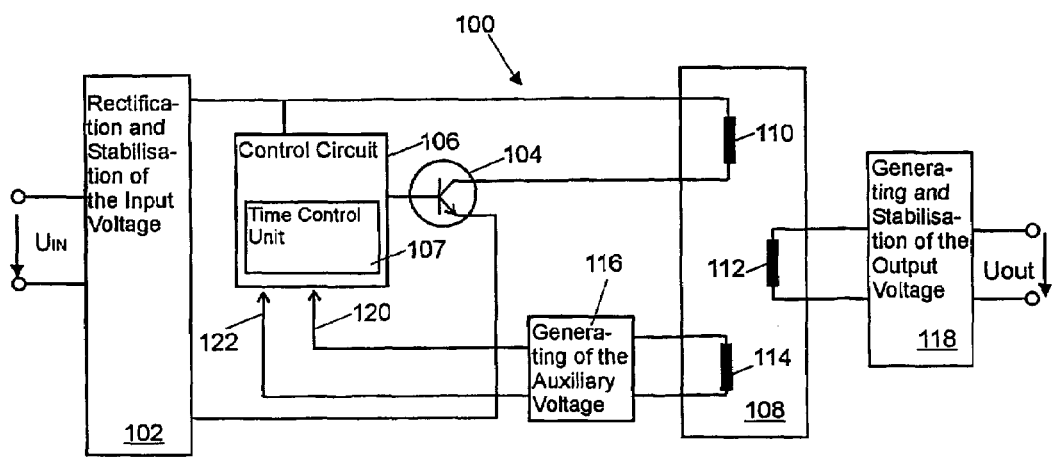
FIG. 1 shows a block diagram of a primary switched-mode power supply according to this invention.

Referring now to the drawings and in particular to FIG. 1, a schematic block diagram of a switched-mode power supply according to this invention is shown. The alternating voltage $U_{IN}$, which may for example be the mains voltage, is applied to the input of the switched-mode power supply 100. In Europe the mains voltage varies between 180 V and 264 V alternating voltage and in America between 90 V and 130 alternating voltage. The input voltage is rectified and stabilised in block 102. In addition, it is ensured that interference signals, which are generated in the switched-mode network, do not access the alternating voltage network. The primary-side winding 110 of the isolating transformer 108 and the primary-side switch 104, which is a transistor here, form a series circuit, which is connected to the rectified input voltage. The primary-side switch 104 interrupts the current, which flows through the primary-side winding 110, according to the control signals from the control circuit 106. The switching pulses supplied from the control circuit to the control input of the primary-side switch 104 are controlled by block 116, in which the controlled variable is generated with the aid of an auxiliary winding 114 of the transformer 108. Here, the two signal paths 120 and 122 refer to two significant functions of the block 116: Firstly the signal 120 "pumps" the control circuit 106 to maintain the free running oscillation. Secondly, the signal path 122 controls the control circuit 106 such that changes in the switching cycle affect the electrical power, which is supplied to the transformer 108, in the desired manner.

According to the invention, the control circuit 106 contains a time control unit 107 for this, which ensures that the pause periods (or also the turn-off times), in which the primary-side switch 104 is open, are matched in length to the required power. The energy, which is supplied to the transformer during each turn-on phase of the primary-side switch, always remains the same.

The secondary-side winding 112 of the transformer 108 is, as can be seen from FIG. 1, connected to a block 118, which generates the secondary-side voltage $U_{OUT}$ and optionally stabilises it.

In the following the functional principle of the embodiment, drawn schematically in FIG. 1, of the electrically insulated switched-mode power supply according to the invention is explained in more detail.

The control circuit 106 controls the primary-side switch 104 such that it is brought alternately into the conducting and non-conducting state. Due to the voltage supplied by the block 102, a current always flows into the primary-side winding 110 when the primary-side switch 104 is in the conducting state. A change in the current stores energy in the magnetic field of the transformer 108. When the primary-side switch 104 blocks, the energy stored in the magnetic field is released mainly through the secondary-side winding 112 and in the block 118, which generates and stabilises the secondary voltage. A small part of the energy is released through the auxiliary winding 114 into the block 116. This generates an auxiliary voltage as a controlled variable. The energy is released periodically, but due to rectification and filtering an essentially rectified voltage can be generated as an auxiliary voltage. Since the magnetic coupling between the various windings of the transformer 108 is constant and does not depend on the value of the current or voltage, the value of the auxiliary voltage is proportional to the value of the secondary voltage and therefore to the value of the output voltage.

By means of the time control unit 107 the turn-off period of the primary-side switch 104 can be set such that the energy fed into the transformer depends on the output voltage. Therefore, the transferred power is set such that an almost load-independent output voltage $U_{OUT}$ is produced. The detection of the output voltage on the primary side is simplified such that the transferred energy is the same with each pulse so that a relatively long time is always provided, during which current flows in the secondary winding 114.

Figure 2:
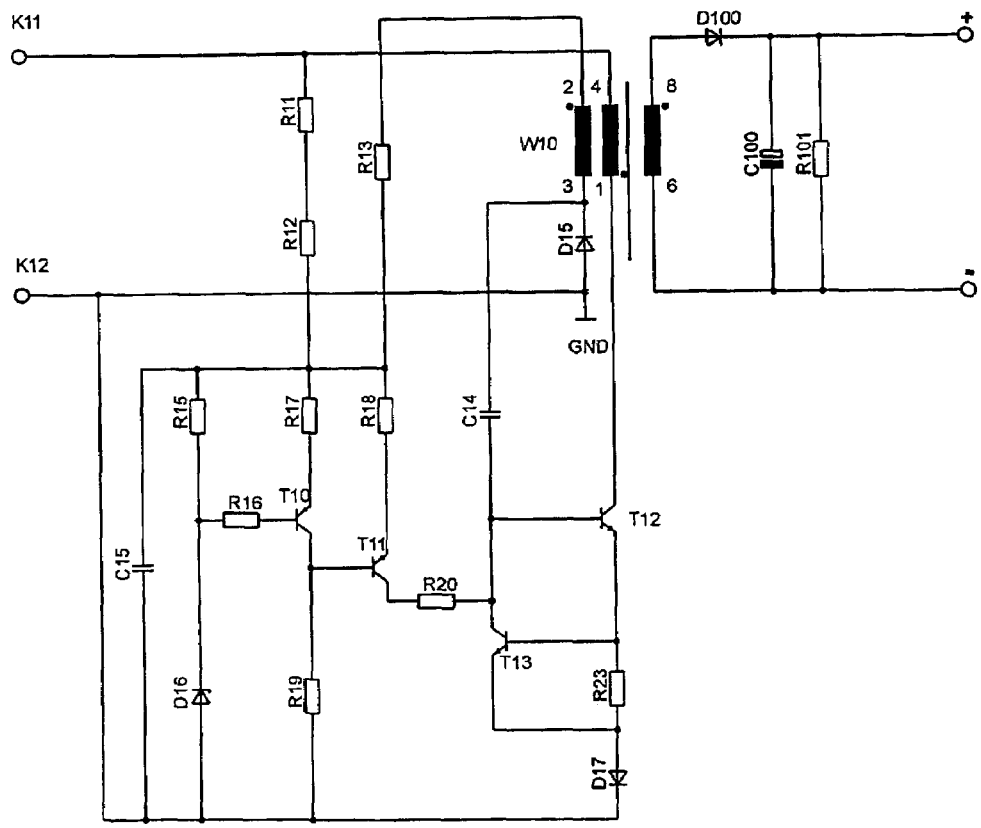
FIG. 2 shows a circuit diagram of a primary switched-mode power supply according to a first embodiment.

A circuit diagram of a possible embodiment of the switched-mode power supply according to the present invention is shown in FIG. 2. The main feature of this circuit is that the turn-off period of the primary-side switch, here the transistor T12, can be extended by the appropriate control of the transistor T11.

After applying of the input voltage $U_{IN}$ to the terminals K11 and K12, the capacitor C15 is charged via the resistors R11 and R12. With sufficient voltage, a current flows through the resistor R18, the base-collector junction of the transistor T11, the resistor R20, the base-emitter junction of the transistor T12, the resistor R23 and the diode D17. Consequently, the primary-side switch T12 is driven open and a current flows through the primary main winding of the transformer W10 (terminal 4/terminal 1). On the auxiliary winding of the transformer (terminal 3/terminal 2) a voltage is induced, which causes direct feedback via the capacitor C15, resistor R23 and capacitor C14, speeding up the turn-on process of the primary-side switch T12.

Now the current increases, which flows through the primary-side main winding, the primary-side switch T12, the resistor R23 and the diode D17. Consequently, the voltage also increases, which is dropped across the resistor R23, and therefore also the base-emitter voltage of the transistor T13. When the base-emitter voltage of the transistor T13 exceeds the threshold voltage, the collector-emitter junction of T13 becomes conducting and the transistor T12 is consequently turned off. This interrupts the flow of current in the primary-side winding of the transformer and the voltages on the transformer windings inverse due to self-inductance. An induced current flows both in the secondary-side winding as well as in the auxiliary winding.

The current in the secondary-side winding charges the capacitor C100, generating a voltage, which can be used at the output. The current in the auxiliary winding charges the capacitor C15 via the diode D15 and the resistor R13 to a voltage, which corresponds to the voltage on the capacitor C100, as converted via the winding ratio of the auxiliary winding to the secondary winding. This means that an image of the output voltage across the capacitor C100 is generated at the capacitor C15. The current in the auxiliary winding also causes via the capacitor C14 an acceleration of the turn-off of the transistor T12.

When the voltage across the capacitor C15 is lower than the sum of the threshold voltages of the diode D16 and the transistor T10, the transistor T10 is blocked and the transistor T11 is conducting so that the capacitor C14 is quickly charged via the series circuit of the resistor R18, transistor T12 and the resistor R20. In this way, the primary-side switch T12 is turned on again after a short pause and starts a new cycle.

If the voltage on C15 exceeds the sum of the threshold voltages of the diode D16 and the transistor T10, the transistor T10 becomes conducting and reduces the base current of the transistor T11 such that it limits the charging current of the capacitor C14, therefore extending the turn-off period of the primary-side switch T12.

Figure 3:
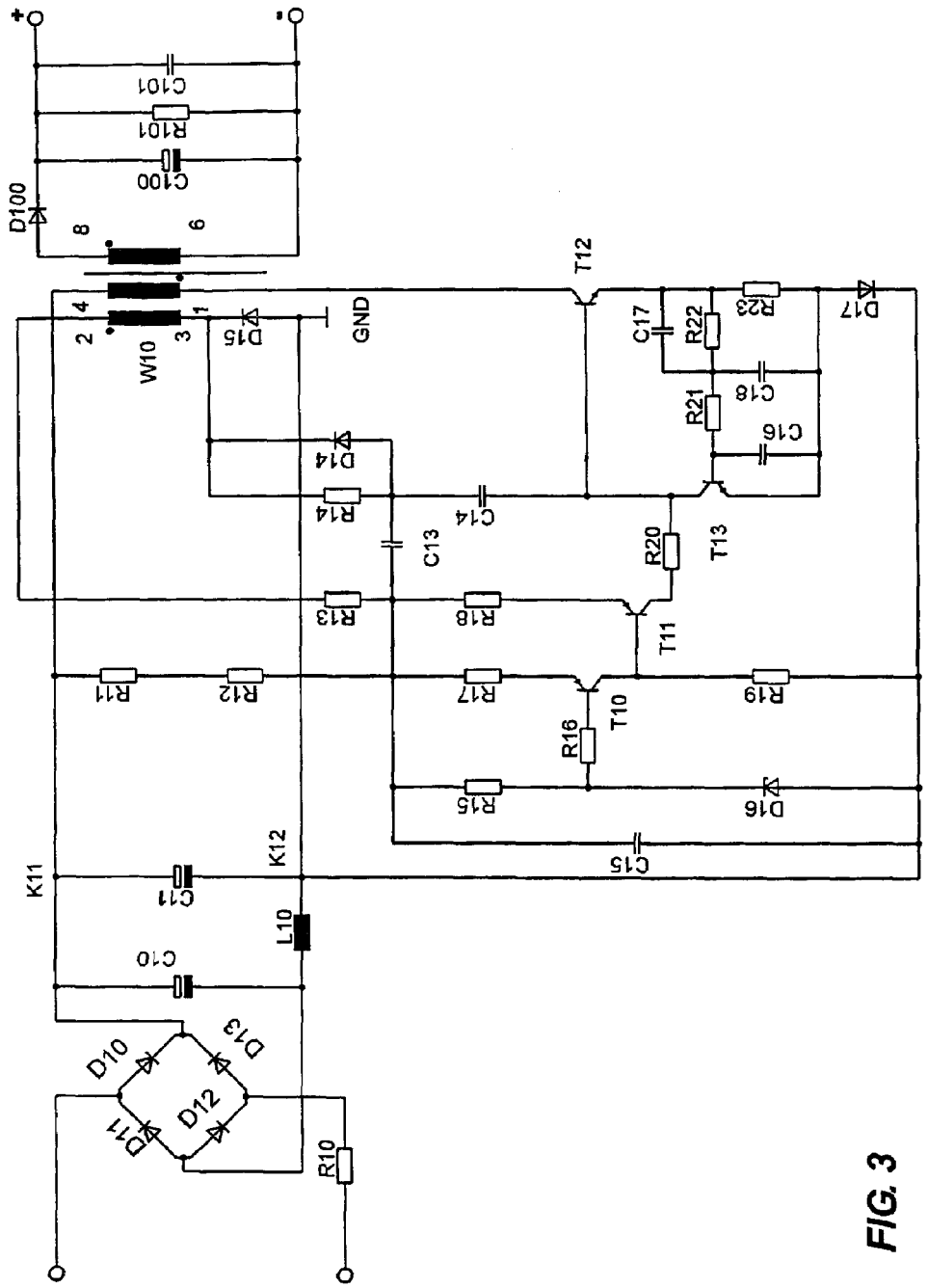
FIG. 3 shows a circuit diagram of a switched-mode power supply according to a second embodiment.

With the illustrated circuit it is therefore possible in a particularly simple manner to adapt the transferred power to the output voltage independently of the connected load by setting the turn-off period. As already mentioned, the detection of the output voltage is simplified such that the transferred energy is the same with each pulse so that a relatively long time is always provided, during which current flows in the secondary winding. Short voltage spikes, which arise due to stray inductances, can be filtered out with appropriately dimensioned RC elements R13, C13, R14, D14, as illustrated in FIG. 3. Consequently, the image voltage on the capacitor C15 represents a very accurate replicate of the voltage across the capacitor C100.

A limitation of the output current results from the maximum frequency which can be set by means of the resistors R18 and R20. This defines the maximum power point. When the maximum power point is exceeded, the output voltage falls and therefore also the voltage across the capacitor C15 decreases. Consequently, the current through the resistors R18 and R20 also falls and as a result, the frequency and the transferred power are reduced. By changing the ratio of the resistance values R18 to R20, the dependence of the output current on the output voltage can be set such that different characteristics are possible.

However, the embodiment shown in FIG. 2 still exhibits a dependence of the output current on the input voltage, because the delay times on the primary-side switch T12 cause a maximum primary current dependent on the input voltage.

This can be countered in that, as shown in FIG. 3 depicting a second embodiment of the switched-mode power supply according to the invention, a capacitor C17 is connected to the emitter of the primary-side switch. In this case the capacitor C18 can be replaced by a resistor. As for the rest, in FIG. 3 components with the same designations as in FIG. 2 are given the same reference symbols.

When, with the primary-side switch T12 turned off, the secondary current has decreased to zero, a voltage at the level of the output voltage $U_{OUT}$ added to the forward voltage of the diode D100 is present on the secondary-side winding. The parasitic capacitances are charged with this voltage. With the transformer W10, these capacitances form an oscillating circuit and the oscillation, which is caused by the energy stored in the parasitic capacitances, can under some circumstances cause the transistor T12 to turn on again prematurely. This in turn leads to a brief control deviation and therefore to an increased ripple on the output voltage $U_{OUT}$. To prevent this, the voltage from the auxiliary winding is, according to the expanded embodiment shown in FIG. 3, passed to the capacitor C14 via a filter formed from the capacitor C13, resistor R14, diode D14 and resistor R13.

Additionally in FIG. 3, a delay element formed by capacitor C16, resistor R21, resistor R22 and capacitor C18 is provided which delays the rise of the base-emitter voltage on transistor T13 due to the rise of voltage across the resistor R23. This delay element is not essential for the function of the circuit, but it increases the efficiency, because the turn-off process of the transistor T12 is accelerated due to the phase shift.

Figure 4:
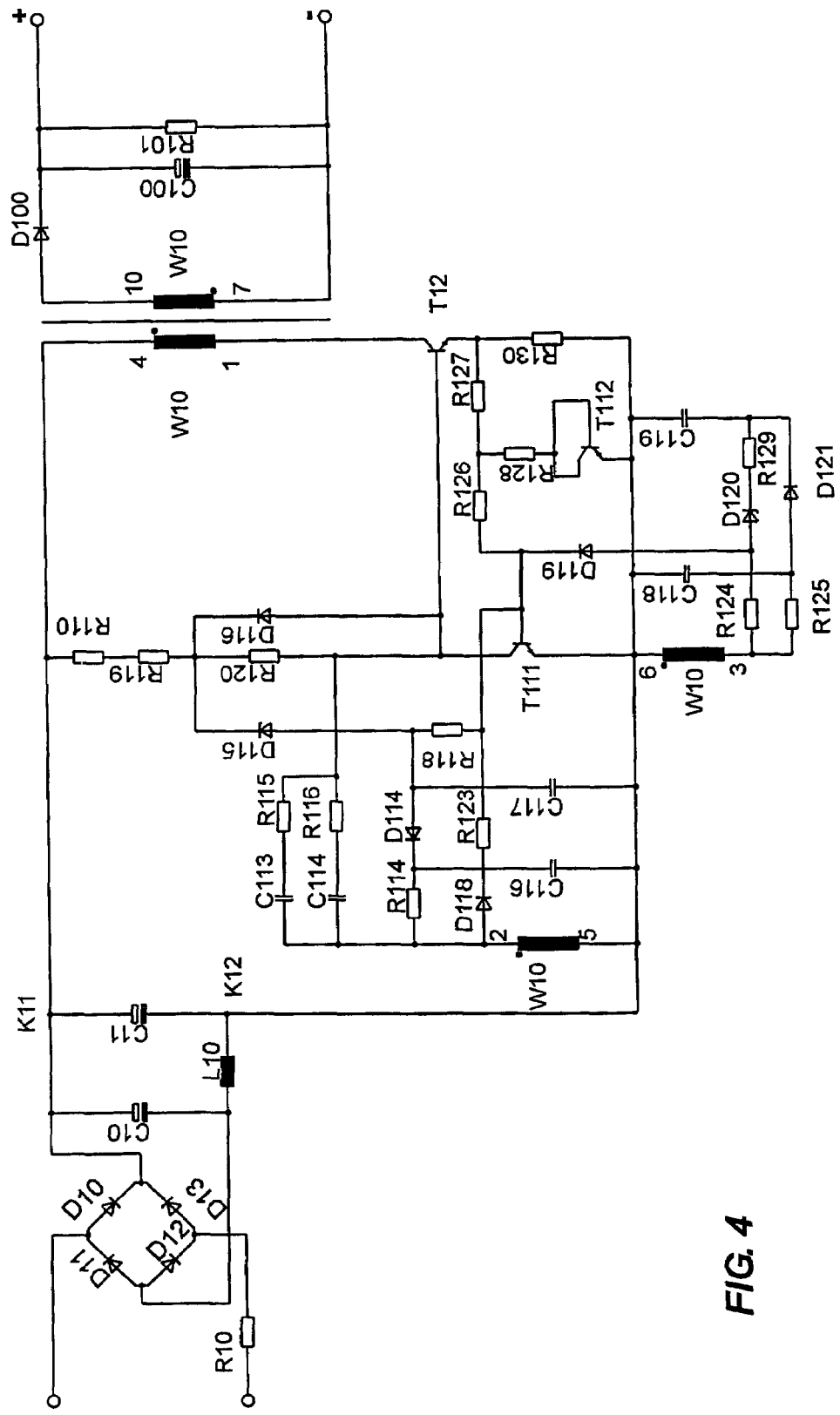
FIG. 4 shows a circuit diagram of a switched-mode power supply according to a third embodiment.

According to a further embodiment, which is shown in the form of a circuit diagram in FIG. 4, a second auxiliary winding can be provided for power control.

The switched-mode power supply shown in FIG. 4 with galvanic separation between the primary and secondary sections also represents a free-running flyback converter. With the additional primary-side auxiliary winding W10 3-6 a negative voltage is generated via the resistor R124 during the turn-on period of the primary-side switch T110 at the anode of the diode D119. (A diode can also be used instead of the resistor R124.) Consequently, on the anode of the diode D119 a current can be fed with which the turn-on period of the transistor T111 is extended without the turn-off threshold being affected.

In this way control of the turn-off period of the transistor T110 is possible. This leads to a low switching frequency on low load and the power loss on open-circuit and on low load is reduced. The secondary voltage can be determined relatively accurately with the aid of the primary auxiliary windings.

A simple voltage limitation may be achieved by means of the diode D120, resistor R129, capacitor C119 and the diode D121. The RC element R125, C118 here filters out the induced voltage spikes from the stray inductance, improving the control characteristics. The resistor R125 provides peak current limitation to protect the diode D121.

The parallel circuit of the RC elements C113, R115 and C114, R116 provides low-resistance switching of the transistor T111 with relatively low holding current. Furthermore, due to the combination of a relatively large capacitor C114 and a large resistance value R116, the transistor T110 can be turned on with a delay, because the energy in the capacitor C114 is only reduced slowly. In this way, a continuous adaptation of the pause duration to the load occurs.

An improvement in the control characteristics on very low load can be achieved in the illustrated embodiment with the aid of the diode D114, capacitor C117, diode D115 and resistor R120 or the diode D116. Due to this circuit, the capacitors C113 and C114 are discharged quicker and charged more slowly. Consequently, very long pause periods are possible, which are automatically extended with increasing output voltage. This circuit also acts as an overvoltage protection and prevents a dangerous rise in the output voltage $U_{OUT}$ with a simple fault.

With the aid of the RC element R114, C116 the induced voltage spikes from the stray inductance can be filtered out, whereby the control characteristics can be further improved.

To reduce the dependence of the output current on the output voltage, the turn-on threshold of the transistor T111 can be matched via the resistor R118.

Furthermore, with the aid of the resistor R123 and the diode D118, the turn-on threshold of the transistor T111 can be matched to reduce the dependence of the output current on the input voltage.

Finally, in the embodiment illustrated in FIG. 4 a temperature compensation circuit is provided, comprising the transistor T112, resistor R128 and resistor R127, to reduce the temperature dependence of the output current.

Figure 5:
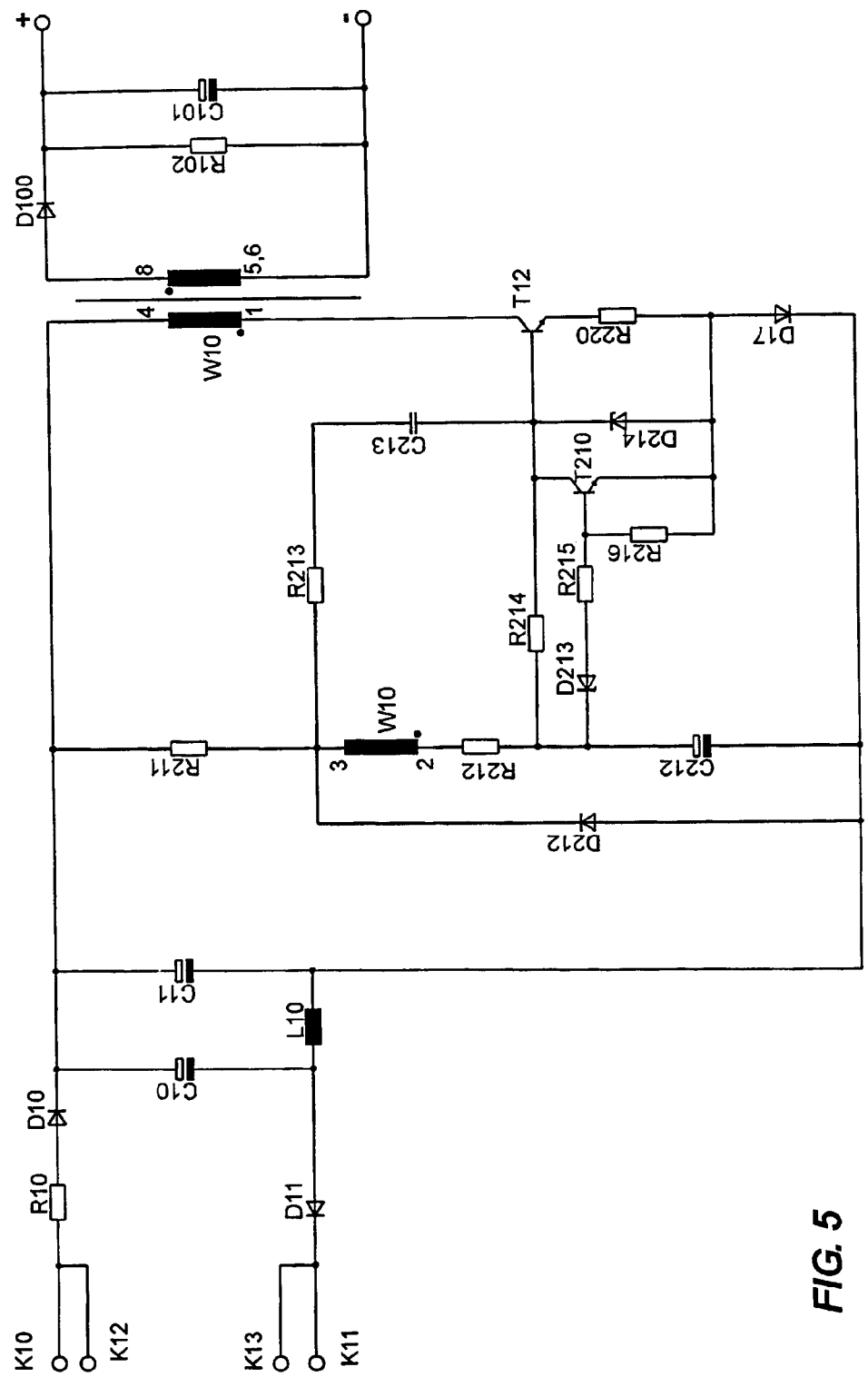
FIG. 5 shows a circuit diagram of a switched-mode power supply according to a fourth embodiment.

A further embodiment of the switched-mode power supply according to the invention is explained in the following with reference to FIG. 5. Here, the functioning principle of the illustrated circuit is the same as that of the circuits of FIGS. 2 and 3 with the difference that the circuit according to FIG. 5 requires substantially fewer components, because the control of the charging current for the control capacitor C213 is realised in a more simple manner. The turn-off of the primary-side switch T12 occurs via a Zener diode D214, which limits the voltage on the series circuit of the base-emitter junction of the primary-side switch T12 and the resistor R220. On reaching the Zener voltage, the flow of current through the transistor T210 cannot increase further and consequently the voltage on the transformer falls and the direct feedback causes the primary-side switch T12 to turn off quickly.

Figure 6:
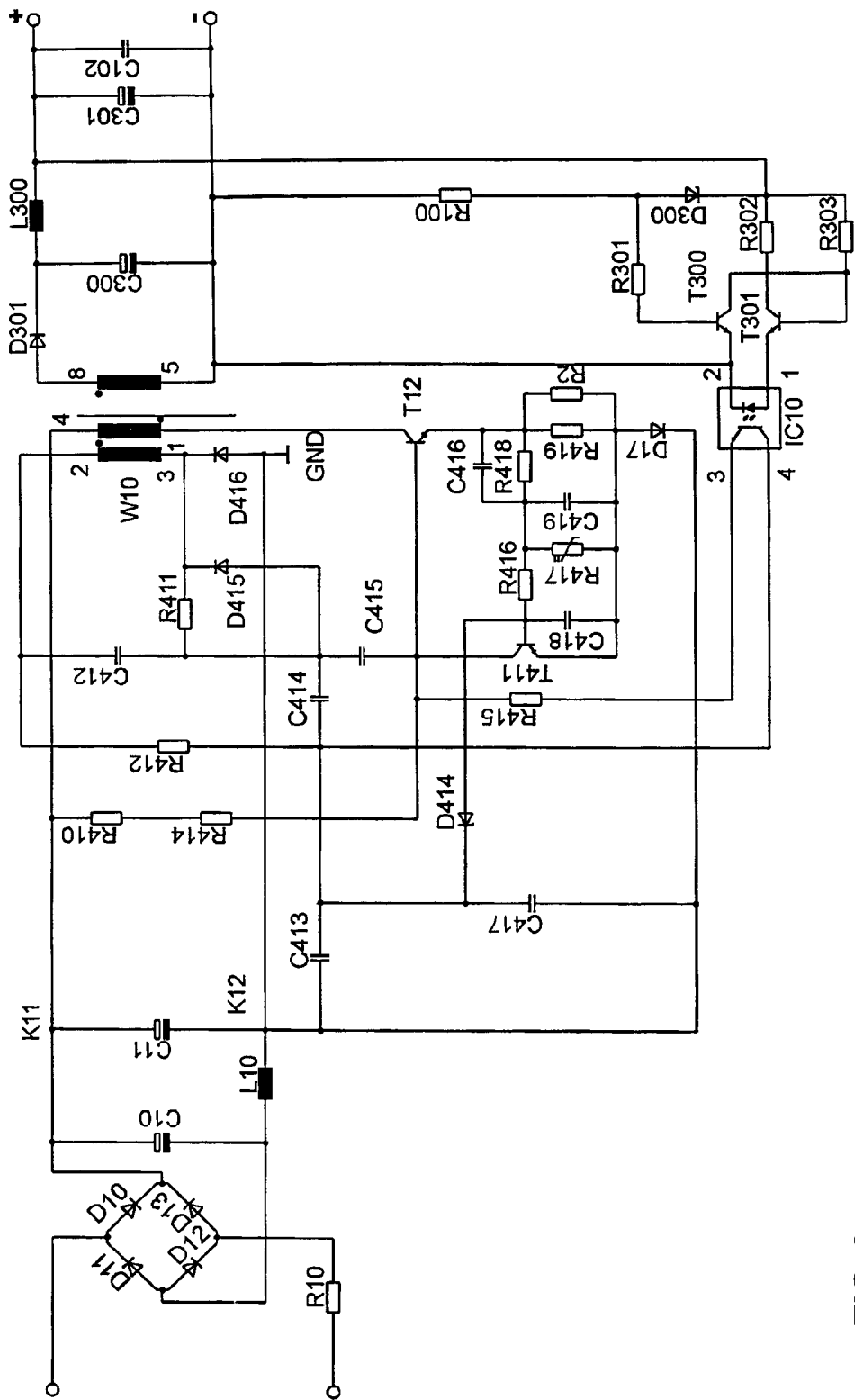
FIG. 6 shows a circuit diagram of a switched-mode power supply according to a fifth embodiment.

With reference to FIG. 6 a further embodiment of the switched-mode power supply according to the invention is now described, in which an additional optocoupler is used for the feedback of the output voltage to the primary side. Various circuits for switched-mode power supplies are known with low open-circuit input powers, which switch off the primary section of the power supply via an optocoupler with the undercutting of a defined output power, thereby facilitating a very low input power. A disadvantage of this known principle is however that the output voltage comprises a very large ripple voltage on open circuit.

With a switched-mode power supply as shown in FIG. 6 the voltage control can be realised using the optocoupler IC10 and a secondary-side control circuit. Here, the optocoupler IC10 is controlled such that it conducts when the control voltage undercuts its limit. In this way, the switched-mode power supply operates below the control voltage at maximum frequency, whereby the frequency is limited by a resistor R415 connected in series with the optocoupler IC10. On reaching the control voltage, the optocoupler IC10 blocks so far that the switching frequency is reduced to the frequency which is required to maintain the control voltage on the output. If the optocoupler IC10 is completely blocked, the switching frequency reverts to the minimum frequency at which only very low power is transferred. In this state the power consumed by the circuit is very low. In this way, it is possible to keep the voltage ripple relatively low despite the very low open-circuit input power.

A current limitation can be realised in this case on the secondary side using the same optocoupler IC10.

Alternatively, the current limitation can also be realised on the primary side. Here, a voltage from the auxiliary winding W10 2-3, which is proportional to the output voltage, is used for the control of the primary-side switch T12 via the optocoupler IC10 and the series resistor R415. As a result, the charging current of the capacitor C414 reduces with falling output voltage and the frequency drops. A lower power is transferred and the output current remains almost constant. Various output characteristics are possible through different dimensioning. One common feature is that the short-circuit current is very low, because the optocoupler is blocked in the short circuit.

In contrast to known methods in which optocouplers are employed, here the minimum frequency and therefore the minimum power are achieved with a blocked optocoupler and the maximum frequency is achieved with a conducting optocoupler. The current control is affected by means of controlling the switching frequency dependent on the output voltage which is transferred by an auxiliary winding.

If in the time control unit a diode is provided, which limits the charging current of the control capacitor during the turn-off time of the primary-side switch, the charging of the control capacitor may be prevented and the power control via the turn-off duration can be facilitated in a particularly efficient and simple manner.

A controlled charging current for the control capacitor may be obtained in a particularly effective manner by a charge-current control circuit, which is arranged between the input terminal of the switched-mode power supply and the control terminal of the primary-side switch.

An oscillation suppression circuit may be provided according to an advantageous further development of this invention in order to suppress unwanted oscillations in the control circuit of the primary-side switch and to consequently increase the control accuracy.

A phase-shift circuit may be provided for the phase-shifted turn-off of the primary-side switch to accelerate the turn-off process of the primary-side switch and consequently to increase the efficiency of the whole switched-mode power supply.

According to a further embodiment, the time control unit is formed such that a control signal can be deactivated during a turn-on time of the primary side switch. In this way, variable pauses and constant pulses can be obtained with a free-running oscillator in a very efficient manner.

According to an advantageous embodiment the switched-mode power supply according to the invention comprises two primary-side auxiliary windings, which may also control the turn-off period of the primary-side switch. In this way, low switching frequencies at low load and a reduced power loss on open circuit can be achieved. The secondary voltage can be determined relatively accurately on the primary auxiliary windings.

If one of the auxiliary windings is connected to the primary-side switch via a diode and a transistor, then a current can be fed to the anode of the diode to extend the turn-on period of the transistor without affecting the turn-off threshold. During the turn-on period of the primary-side switch, a negative voltage is generated on the anode of the diode. Alternatively, the series circuit of two diodes or two resistors may also be used. An additional resistor may be provided to limit the peak current for the diode.

If one of the auxiliary windings is connected via a second diode to a capacitor such that same can be charged to the voltage to be regulated on the secondary side and that, in dependence of the voltage applied to the capacitor, a current flows through the diode, a resistor, a third diode and the base-emitter junction of the transistor, which delays the turn-on of the primary-side switch due to the turn-on period of the transistor, a voltage-controlled setting of the turn-off period of the primary-side switch can be obtained. RC elements, which are connected to a control terminal of the primary-side switch and to the first auxiliary winding, can facilitate relatively low-resistance switching in the control circuit for a relatively low holding current. Due to the combination of a relatively large capacitor with a large resistance value, the primary-side switch can in addition be turned on delayed, because the energy in the capacitor decays only slowly. This facilitates continuous adaptation to the load.

An improvement in the control properties with a very low load is possible with the aid of an overvoltage protection circuit. Due to this circuit, the control capacitors are with increasing output voltage discharged quicker and charged more slowly.

Consequently, very long pause periods are possible, which are automatically extended with increasing output voltage. This circuit acts as an overvoltage protection and prevents a dangerous rise in the output voltage with a simple fault.

According to an advantageous embodiment, the charge-current control circuit comprises a first Zener diode, which is connected via a resistor to the base of a control transistor such that the turn-on period of the control transistor delays the turn-on of the primary-side switch. In this way, a functioning principle is obtained, which essentially corresponds to that described above, whereby however the control of the charging current for the control capacitor can be realised in a more simple manner. A significant advantage is a reduced component requirement.

Furthermore, the turning-off of the main switch can be affected by a Zener diode, which limits the voltage at the series circuit of the base-emitter junction of the main switch with a resistor. On reaching the Zener voltage, the current flow through the primary-side switch cannot rise any further. Consequently, the voltage at the transformer is reduced and the direct feedback causes a quick turn-off.

The temperature dependence of the output current can be reduced in a simple manner by means of a temperature compensation circuit.

According to an advantageous further development of this invention, the voltage control can be realised using an optocoupler and a secondary-side control circuit. Here, the optocoupler is controlled such that it conducts when the control voltage undercuts its limit. In this way, the switched-mode power supply runs at maximum frequency, whereby the frequency is limited by a resistor connected in series with the optocoupler. On reaching the control voltage, the optocoupler blocks so far that the switching frequency is reduced to the frequency which is required to maintain the control voltage on the output. If the optocoupler is completely blocked, the switching frequency goes back to the minimum frequency at which only very low power is transferred. In this state the power taken up by the circuit is very low and it is therefore possible, despite the very low open-circuit input power, to maintain the voltage ripple relatively low also on open circuit.

A current limitation may be realised in this case on the secondary side, using the same optocoupler used. Alternatively, the current limit can also be realised on the primary side. Here, a voltage from an auxiliary winding, which is proportional to the output voltage, is used for the control of the primary-side switch (via the optocoupler and series resistor). As a result, the charging current of the control capacitor decreases with falling output voltage and the frequency drops. A lower power is transferred and the output current remains, for example, almost constant. Various output characteristics are possible through different dimensioning. One common feature is that the short-circuit current is very low, because the optocoupler is blocked in the short circuit. Apart from low costs and an exact output voltage control, this embodiment also offers the advantage of a low open-circuit input power and short-circuit protection.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention.

In addition, those areas in which it is believed that those ordinary skilled in the art are familiar have not been described herein in order to not unnecessarily obscure the invention described herein. Accordingly, it is to be understood that the invention is not to be limited by the specific illustrated embodiments, but only by the scope of the appended claims.

The invention claimed is:

1. Switched-mode power supply with a primary side and a secondary side and with a transformer with a primary-side winding, a secondary-side winding and at least one auxiliary winding, wherein the primary-side winding and the auxiliary winding are connected to the primary side and the secondary-side winding is connected to the secondary side,
   a primary-side switch, which is connected to the primary-side winding in order to interrupt a flow of current through the primary-side winding,
   a freely oscillating control circuit for generating switching pulses which drive the primary-side switch,
   a circuit for generating an image voltage between the terminals of the auxiliary winding, in order to generate an image voltage, which on the primary side replicates a voltage to be controlled on the secondary side,
   wherein the switched-mode power supply further comprises a timing unit, which is coupled to the primary-side switch such that the duration of a turn-off period of the primary-side switch is variable within a switching cycle,
   wherein the timing unit comprises a control capacitor, and wherein the turn-off time of the primary-side switch can be adjusted by the charging current of said control capacitor, and
   wherein the timing unit comprises a diode, which is arranged between the primary-side switch and an input terminal of the switched-mode power supply such that the charging current of the control capacitor can be limited during the turn-off time of the primary-side switch.

2. Switched-mode power supply according to claim 1, wherein an oscillation suppression circuit is connected to the auxiliary winding such that unwanted oscillations in the control circuit of the primary-side switch are suppressed.

3. Switched-mode power supply according to claim 1, wherein a phase-shift circuit is provided for the phase-shifted turn-off of the primary-side switch.

4. Switched-mode power supply according to claim 1, wherein the charging current of the control capacitor can be controlled by a charge-current control circuit, which is arranged between the input terminal of the switched-mode power supply and a control terminal of the primary-side switch.

5. Switched-mode power supply according to claim 4, wherein the charge-current control circuit comprises two amplifiers, which are connected in series.

6. Switched-mode power supply according to claim 5, wherein the charge-current control circuit further comprises a first Zener diode, which is connected via a resistor to the base of a control transistor such that the turn-on duration of the control transistor delays the turn-on of the primary-side switch.

7. Switched-mode power supply according to claim 6, wherein the charge-current control circuit furthermore comprises a second Zener diode, which is connected in parallel to the series circuit of the base-emitter junction of the primary-side switch and a resistor connected to the emitter of the primary-side switch.

8. Switched-mode power supply according to claim 1, wherein the timing unit is adapted to deactivate a control signal during a turn-on period of the primary-side switch.

9. Switched-mode power supply according to claim 1, comprising two primary-side auxiliary windings.

10. Switched-mode power supply according to claim 9, wherein one of the auxiliary windings is connected to the primary-side switch via a resistor, a diode and a transistor.

11. Switched-mode power supply according to claim 10, wherein one of the auxiliary windings is connected via a second diode to a capacitor such that it can be charged to the voltage to be controlled on the secondary side and that, in dependence of the voltage present at the capacitor, a current flows through the diode, resistor, a third diode and the base-emitter junction of the transistor, which delays the turn-on of the primary-side switch due to the turn-on duration of the transistor.

12. Switched-mode power supply according to claim 9, wherein the control circuit comprises an overvoltage protection circuit.

13. Switched-mode power supply according to claim 1, further comprising an optocoupler for feeding back a secondary-side voltage to the primary circuit.

14. Switched-mode power supply according to claim 13, wherein the optocoupler is connected such that with the optocoupler in a blocking state a minimum power can be transferred and in the conducting state a maximum power can be transferred.

15. Switched-mode power supply according to claim 1, further comprising a temperature compensation circuit for compensating the temperature of the switching threshold of the primary-side switch.

* * * * *